US008832263B2

United States Patent
Meier et al.

(10) Patent No.: US 8,832,263 B2
(45) Date of Patent: Sep. 9, 2014

(54) DYNAMIC RESOURCE ADAPTATION

(75) Inventors: Andreas Meier, Heidelberg (DE); Martin Kaiser, Mannheim (DE)

(73) Assignee: SAP, AG, Walldorf (DE)

( * ) Notice: Subject to any disclaimer, the term of this patent is extended or adjusted under 35 U.S.C. 154(b) by 287 days.

(21) Appl. No.: 13/329,591

(22) Filed: Dec. 19, 2011

(65) Prior Publication Data
US 2013/0159501 A1 Jun. 20, 2013

(51) Int. Cl.
*G06F 15/16* (2006.01)
(52) U.S. Cl.
USPC ............................. 709/224; 709/226; 320/109
(58) Field of Classification Search
USPC .................. 709/226, 224; 320/109
See application file for complete search history.

(56) References Cited

U.S. PATENT DOCUMENTS

2002/0120744 A1* 8/2002 Chellis et al. .................. 709/226
2012/0229089 A1* 9/2012 Bemmel et al. ............... 320/109

* cited by examiner

*Primary Examiner* — Tammy Nguyen
(74) *Attorney, Agent, or Firm* — Buckley, Masschoff & Talwalkar LLC

(57) ABSTRACT

A system may include determination of historical resource load information associated with an enterprise computing system, determination of resource needs of the enterprise computing system associated with a future time based on the historical resource load information, and, at the future time, automatic allocation and de-allocation of resources to the enterprise computing system based on the determined resource needs.

18 Claims, 4 Drawing Sheets

DYNAMIC RESOURCE ADAPTATION

FIELD

Some embodiments relate to enterprise computing systems. More specifically, some embodiments relate to systems to facilitate proactive resource adaptation within an enterprise computing system.

BACKGROUND

Conventional enterprise computing systems include disparate logical components, each of which is implemented by a combination of hardware and software. A system designer initially configures this hardware and software based upon available resources and estimated system requirements. For example, an initial system configuration may specify a number of virtual machines allotted to application servers and a number of processes per application server.

Over a system's lifecycle, it may become desirable to change the initial system configuration. For example, the initial system configuration may not be suitable to address certain changes in customer requirements (e.g., number of system users) or system loads (e.g., resulting in low available memory). In order to address these changes, conventional systems rely on manual intervention by a system operator. Specifically, the operator may detect changes (e.g., via system alerts or customer complaints) and react by changing the system configuration. Some conventional systems provide limited automatic reactive intervention, for example, by increasing available memory in response to detecting a low memory situation.

Systems are desired to efficiently facilitate the adaptation of enterprise system resources. Such systems may operate reactively as well as proactively, in contrast to those conventional systems described above.

DETAILED DESCRIPTION

Figure 1:
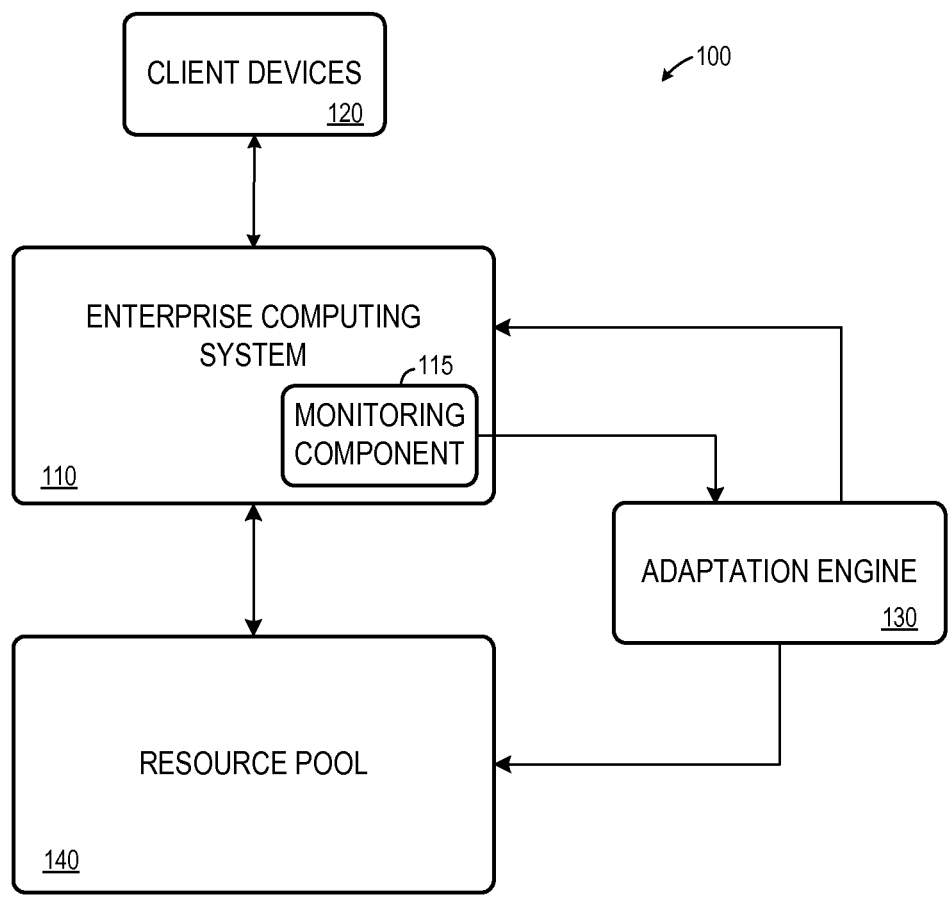
FIG. 1 is a block diagram of a system according to some embodiments.

FIG. 1 is a block diagram of system 100 according to some embodiments. FIG. 1 represents a logical architecture for describing some embodiments, and actual implementations may include more or different components arranged in other manners.

System 100 includes enterprise computing system 110 to provide business functionality to client devices 120 as is known in the art. Enterprise computing system 110 may provide one or more of customer relationship management, human resource management, supply chain management, accounting, or other functions to business users operating client devices 120. Embodiments are not limited to a "business" context.

Enterprise computing system 110, as will be described in detail below with respect to FIG. 3, may comprise any number of processors, physical memory, and associated hardware. Enterprise computing system 110 may also be configured to support a particular number of application servers, each of which supports specified numbers of dialog and batch processes. Enterprise computing system 110 may also include a specified number of persistent datastores.

Monitoring component 115 captures load information related to the operation of enterprise computing system. Load information may include, but is not limited to, number of waiting processes, elapsed time of any running process, available memory, available disk space, processor load, and/or any other indicator of system performance that is or becomes known. The load information may be captured via periodic queries from monitoring component 115 as well as through alerts or system notifications pushed to monitoring component 115 by enterprise computing system 110. Embodiments are not limited to the inclusion of monitoring component 115 within system 110.

The load information is received by adaptation engine 130. Adaptation engine 130 may analyze the load information and determine the future resource needs of enterprise computing system 110 associated with one or more future time periods. In one example, adaptation engine 130 analyzes load information received from monitoring component 115 to identify heavy resource usage during first three weeks of December (e.g., due to Year-end reporting and planning functions). Accordingly, adaptation engine 130 determines particular resource needs (e.g., number of application servers, amount of volatile memory for a particular application server, number of fixed disks) of enterprise computing system 110 and associates those needs with the first three weeks of December. Additional examples of the determination of resource needs will be provided below. According to some embodiments, adaptation engine 130 may also receive and analyze load information to determine current resource needs.

Resource pool 140 includes resources that may be employed to satisfy resource needs of enterprise computing system 110. Any hardware and/or software resources mentioned herein may be available to enterprise computing system 110 via resource pool 140. Such resources include but are not limited to virtual machines, processor cores, volatile memory (e.g., Random Access Memory), and non-volatile memory (e.g., fixed disks).

Adaptation engine 130 may operate in conjunction with resource pool 140 to automatically allocate one or more resources from resource pool 140 to enterprise computing system 110 based on the determination of future resource needs described above. Continuing with the above example, adaptation engine 130 may determine that the current time is the beginning of December. Adaptation engine 130 may therefore automatically instruct resource pool 140 to provide resources to enterprise computing system 110 so that the particular resource needs associated with the first three weeks of December are satisfied. Provision of the resources may of course include a change to configuration data of enterprise computing system 110.

As mentioned above, adaptation engine 130 may also receive and analyze load information to determine current resource needs. In such a case, adaptation engine 130 may operate in conjunction with resource pool 140 as described above to immediately (i.e., without waiting for a specific future time) allocate one or more resources from resource pool 140 based on the current resource needs.

Adaptation engine 130 and resource pool 140 may operate similarly to "de-allocate" resources from enterprise computing system 110. For example, upon determining the expiration of the first three weeks of December, adaptation engine 130 may instruct resource pool 140 to retake some or all of the previously-allocated resources such that the resource needs of the period after the first three weeks of December are met.

Client devices 120 display user interfaces and data received from enterprise computing system 110, and may also be operated to process such data and send data back to system 110. Client devices 120 may comprise any suitable device, such as a desktop computer, a laptop computer, a personal digital assistant, a tablet PC, and a smartphone. Client devices 120 may execute program code of a rich client application, an applet in a Web browser, or any other application allowing communication (e.g. via Web Services) with enterprise computing system 110 to access the business functionality provided thereby.

Figure 2:
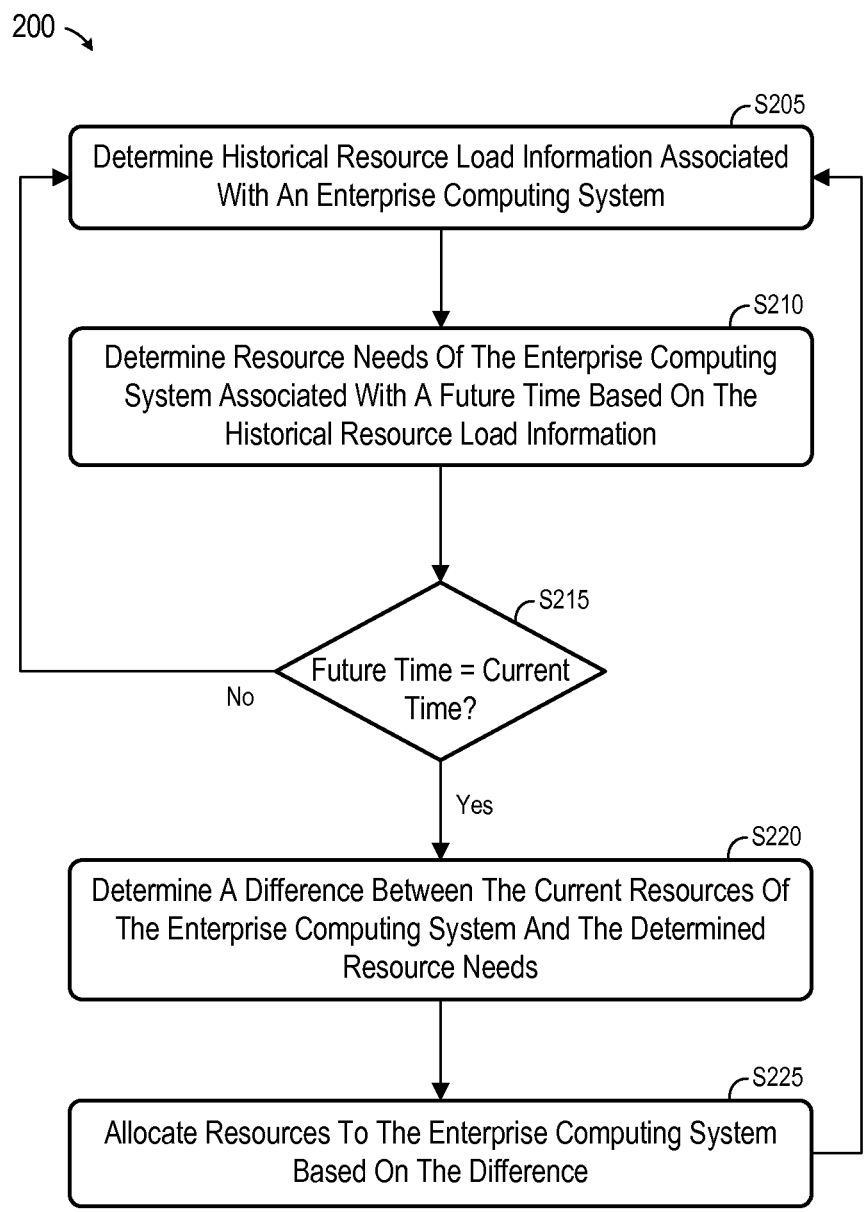
FIG. 2 is a flow diagram of a process according to some embodiments.

FIG. 2 comprises flow diagram of process 200 according to some embodiments. In some embodiments, various hardware elements of system 100 execute program code to perform process 200. In some embodiments, hard-wired circuitry may be used in place of, or in combination with, program code for implementation of processes according to some embodiments. Embodiments are therefore not limited to any specific combination of hardware and software.

For purposes of example, process 200 will be described as if executed by adaptation engine 130 of system 100. As mentioned above, embodiments are not limited thereto.

Historical resource load information associated with an enterprise computing system is initially determined at S205. The load information may include, but is not limited to, number of waiting processes, elapsed time of any running process, available memory, available disk space, processor load, and/or any other indicator of system performance that is or becomes known. The load information may be collected over time, continuously and/or at discrete intervals (e.g., nightly). The load information may be received from one or more monitoring components residing within the enterprise computing system.

Next, at S210, resource needs of the enterprise computing system are determined based on the historical load information. The determined resource needs are associated with a future time. Determination of the future resource needs may be based on an extrapolation of current needs determined based on the historical load information, and/or based on algorithms/rules/calculations executed based on the historical load information (e.g., a pattern matching algorithm to identify high load and low load time periods, a rule specifying a maximum of eight tenants per database, etc.). Accordingly, after S210, adaptation engine 130 may, in some embodiments, possess a calendar associating various time periods with respective resource needs.

Flow returns to S205 if it is determined at S215 that one of the future time periods has not yet arrived. Accordingly, in some embodiments, historical load information and future resource needs continue to be determined at S205 and S210 while waiting for one of the future time periods to arrive. Alternatively, some embodiments may simply cycle at S215 while waiting for one of the future time periods to arrive.

Flow proceeds to S220 upon reaching a future time period for which resource needs have been determined. At S220, a difference is determined between the current resources of the enterprise computing system and the determined resource needs. S220 may therefore comprise analyzing a current configuration of the enterprise computing system to determine its current resources.

Next, at S225, resources are allocated to the enterprise computing system based on the difference determined at S220. For example, adaptation engine 130 may instruct resource pool 140 to allocate application servers, volatile memory and/or processor cores based on the current needs (i.e., the difference between the current resources and the needed resources) of enterprise computing system 110. Flow then returns to S205 and continues as described above.

As mentioned above, some embodiments may also determine current resource needs based on the load information and operate to automatically allocate or de-allocate resources based on a difference between the current resources and the current resource needs. Accordingly, for such an operation, no waiting at S215 is required.

Figure 3:
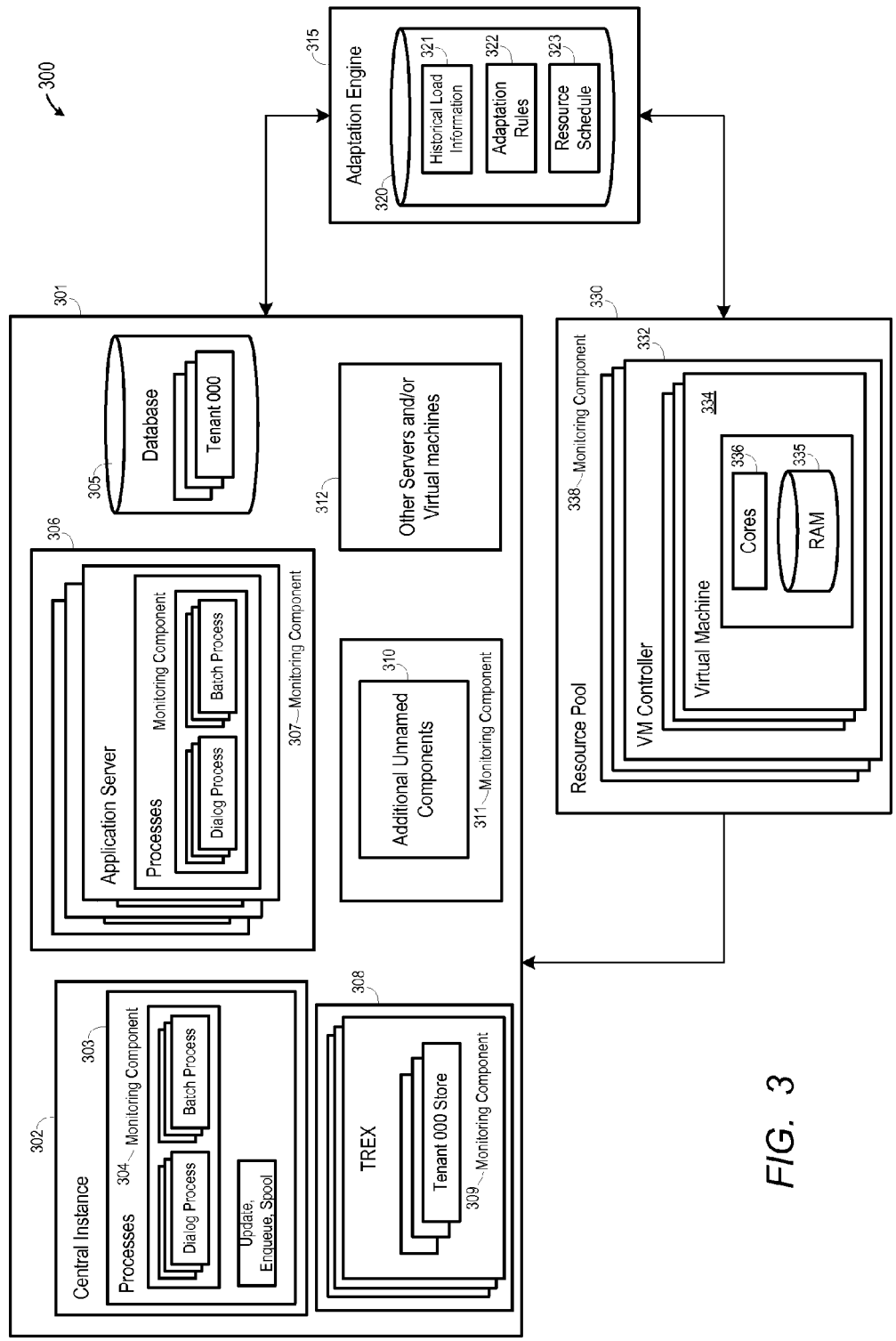
FIG. 3 is a detailed block diagram of a system according to some embodiments.

FIG. 3 is a detailed block diagram of system 300 according to some embodiments. System 300 includes enterprise computing system 301, adaptation engine 315 and resource pool 330.

Enterprise computing system 301 may implement an Advanced Business Application Programming platform as is known in the art. System 301 includes central instance 302, which includes processes 303 and monitoring component 304. The configuration of system 301 specifies the number of processes within processes 303, including dialog processes and batch processes to handle user interaction and to run background jobs. The number of processes will be referred to herein as Dimension A. According to the illustrated embodiment, each described Dimension is associated with a monitoring component to provide load information which may assist in determining the allocation of resources within that Dimension.

System 301 also includes application servers 306 and associated monitoring component 307. Each of application servers 306 provides additional hardware to execute additional processes. The system configuration therefore also specifies a number of processes (i.e., Dimension A) associated with each of application servers 306, as well as specifying the total number of application servers 306 (i.e., Dimension B).

Resources may be allocated within Dimension A based on information received from its monitoring components (e.g., historical number of active daytime users, scheduling of time-consuming Job abc). Dimension B, on the other hand, may be controlled if the current hardware/virtual machines cannot adequately handle the current processes or, conversely, if the current hardware/virtual machines are unacceptably idle.

System 301 also includes TREX Servers 308 to provide fast access to data. The number of TREX servers (i.e., Dimension C) may be controlled based, for example, on the number of tenants. In this regard, it may be assumed that one TREX Server 308 can handle a specified maximum number of tenants. This maximum number may depend highly on RAM consumption by the underlying application.

Additional components 310 represent other supporting tools which may exist within system 301 and, as they will be considered as a separate dimension (Dimension D) herein, are associated with monitoring component 311. Servers and/or virtual machines 312 are allocated to and available for use by system 301 but are currently unused.

Adaptation engine 315 may receive information from each monitoring component of system 301 and may operate as described above with respect to adaptation engine 130 and process 200. Adaptation engine 315 includes historical load information 321 (e.g., received from the monitoring components and/or other sources), adaptation rules 322 and resource schedule 323. Resource schedule 323 may specify resource needs of system 301 for each of one or more future time periods. Adaptation engine 315 may determine resource schedule 323 by applying adaptation rules 322 to historical load information 321.

Resource pool 330 of system 300 includes several virtual machine controllers 332, each of which controls one or more virtual machines 334. In turn, each virtual machine 334 includes RAM 335 and processor cores 336. The "hardware" of virtual machines 334 may be allocated to system 301 and will be referred to as Dimension E. As part of such allocation, adaptation engine 315 may instruct system 301 to use more or less "hardware".

Resource pool 330 may be governed by a pool controller (not shown) to allocate resources to system 301 based on instructions received from adaptation engine 315. For example, adaptation engine 315 may request hardware/virtual machines, and the pool controller, in response, assigns, installs and activates the required resource. The pool controller may also reverse these steps under instruction of adaptation engine 315 to return a resource to pool 330.

The load distribution among virtual machines 334 (i.e., Dimension F) may also be controlled by adaptation engine 315 based on information from monitoring component 338, in order to reduce hardware bottlenecks. More specifically, the distribution of virtual machines 334 among several virtual machine controllers 332 (i.e., physical hardware) may be controlled based on the detected load of each virtual machine 334.

Figure 4:
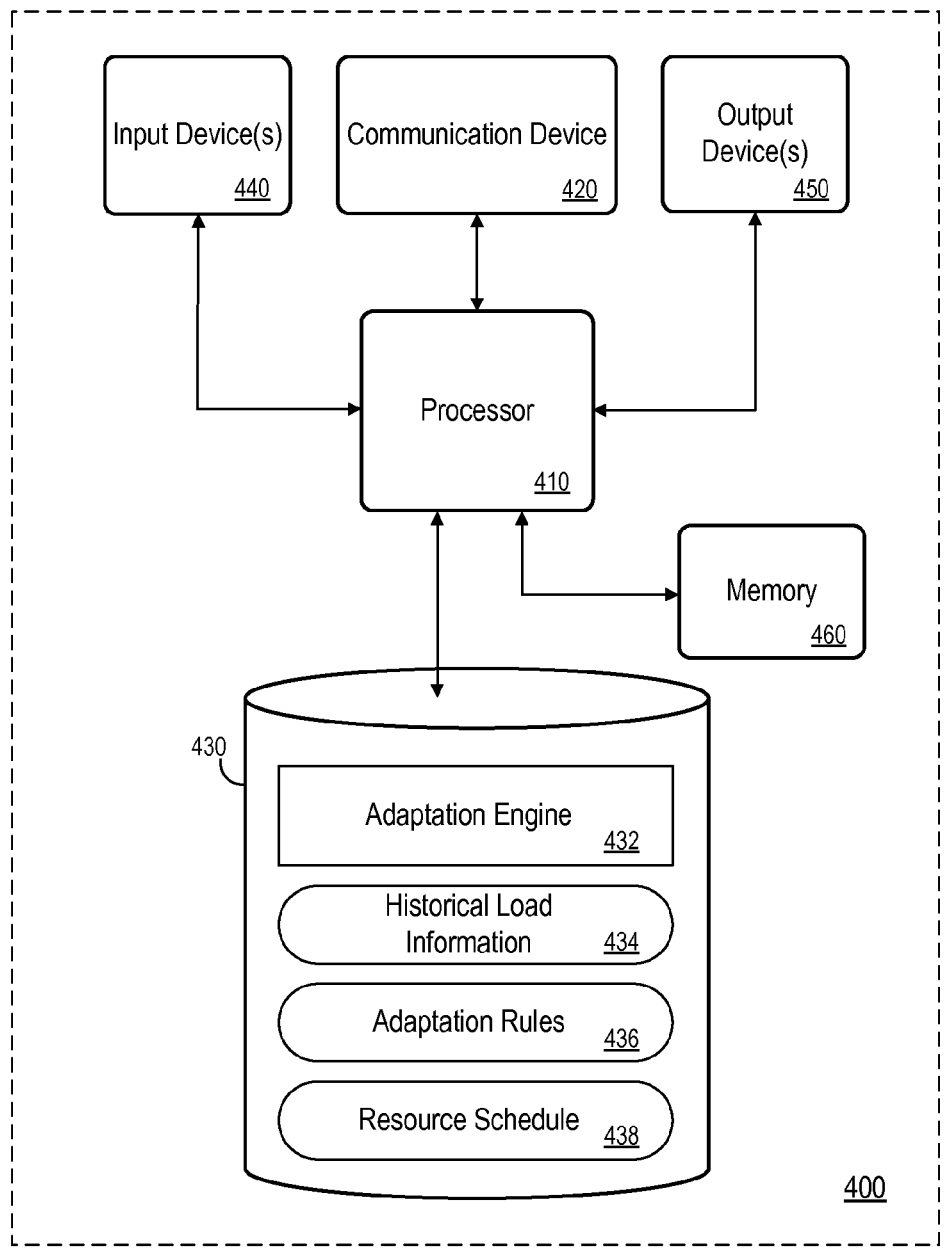
FIG. 4 is a block diagram of a computing device according to some embodiments.

FIG. 4 is a block diagram of apparatus 400 according to some embodiments. Apparatus 400 may comprise a general-purpose computing apparatus and may execute program code to perform any of the functions described herein. Apparatus 400 may comprise an implementation of adaptation engine 130 and/or adaptation engine 315. Apparatus 400 may include other unshown elements according to some embodiments.

Apparatus 400 includes processor 410 operatively coupled to communication device 420, data storage device 430, one or more input devices 440, one or more output devices 450 and memory 460. Communication device 420 may facilitate communication with external devices, such as an external design tool. Input device(s) 440 may comprise, for example, a keyboard, a keypad, a mouse or other pointing device, a microphone, knob or a switch, an infra-red (IR) port, a docking station, and/or a touch screen. Input device(s) 440 may be used, for example, to enter information into apparatus 400. Output device(s) 450 may comprise, for example, a display (e.g., a display screen) a speaker, and/or a printer.

Data storage device 430 may comprise any appropriate persistent storage device, including combinations of magnetic storage devices (e.g., magnetic tape, hard disk drives and flash memory), optical storage devices, Read Only Memory (ROM) devices, etc., while memory 460 may comprise RAM.

Adaptation engine 432 of data storage device 430 may comprise program code executable by processor 410 to provide any of the functions described herein. Embodiments are not limited to execution of these functions by a single apparatus. Also stored in data storage device 430 are historical load information 434, adaptation rules 436 and resource schedule 438 as described above. Data storage device 430 may also store data and other program code for providing additional functionality and/or which are necessary for operation thereof, such as device drivers, operating system files, etc.

Each system described herein may be implemented by any number of computing devices in communication with one another via any number of other public and/or private networks. Two or more of such computing devices may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 and/or system 300 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method implemented by an enterprise computing system in response to execution of program instructions by a processor of the computing system, the method comprising:
   capturing load information related to operation of the enterprise computing system, the load information including at least one of a number of computing processes waiting execution, an elapsed time of any running computing process, and a processor computing load;
   determining historical resource load information associated with the enterprise computing system based on the captured load information;
   determining future resource needs of the enterprise computing system associated with a future time based on the historical resource load information; and
   at the future time, automatically allocating resources to the enterprise computing system based on the determined resource needs.

2. The method according to claim 1, wherein automatically allocating resources to the enterprise computing system at the future time comprises:
   determining a difference between current resources of the enterprise computing system and the determined resource needs; and
   automatically allocating the resources to the enterprise computing system based on the difference.

3. The method according to claim 2, wherein the determining the future resource needs step includes:
   determining second resource needs of the enterprise computing system associated with a second future time based on the historical resource load information; and
   at the second future time, automatically allocating second resources to the enterprise computing system based on the determined second resource needs.

4. The method according to claim 1, wherein the determining the future resource step includes:
   determining second resource needs of the enterprise computing system associated with a second future time based on the historical resource load information; and
   at the second future time, automatically allocating second resources to the enterprise computing system based on the determined second resource needs.

5. The method according to claim 1, wherein the allocated resources comprise one or more of a process, a virtual machine, a processor core, and random access memory.

6. The method according to claim 1, wherein determining the historical resource load information comprises:
   periodically receiving resource load information from a monitoring component of the enterprise computing system.

7. A non-transitory computer-readable storage medium storing processor-executable program instructions, the program instructions executable by a device to:
- capture load information related to operation of an enterprise computing system, the load information including at least one of a number of computing processes waiting execution, an elapsed time of any running computing process, and a processor computing load;
- determine historical resource load information associated with the enterprise computing system based on the captured load information;
- determine future resource needs of the enterprise computing system associated with a future time based on the historical resource load information; and
- at the future time, automatically allocate resources to the enterprise computing system based on the determined resource needs.

8. The medium according to claim 7, wherein the program instructions executable by a device to automatically allocate resources includes program instructions executable by a device to:
- determine a difference between current resources of the enterprise computing system and the determined resource needs; and
- automatically allocate the resources to the enterprise computing system based on the difference.

9. The medium according to claim 8, wherein the program instructions executable by a device to determine the future resource needs includes program instructions executable by a device to:
- determine second resource needs of the enterprise computing system associated with a second future time based on the historical resource load information; and
- at the second future time, automatically allocate second resources to the enterprise computing system based on the determined second resource needs.

10. The medium according to claim 7, wherein the program instructions executable by a device to determine the future resource needs includes program instructions executable by a device to:
- determine second resource needs of the enterprise computing system associated with a second future time based on the historical resource load information; and
- at the second future time, automatically allocate second resources to the enterprise computing system based on the determined second resource needs.

11. The medium according to claim 7, wherein the allocated resources comprise one or more of a process, a virtual machine, a processor core, and random access memory.

12. The medium according to claim 7, wherein the program instructions executable by a device to determine the historical resource load information includes program instructions executable by a device to:
- periodically receive resource load information from a monitoring component of the enterprise computing system.

13. An enterprise computing system comprising:
- a monitoring component configured to capture load information related to operation of the enterprise computing system, the load information including at least one of a number of computing processes waiting execution, an elapsed time of any running computing process, and a processor computing load;
- an adaptation engine configured to receive the captured load information and to analyze the captured load information;
- a computing device including:
  - a memory storing processor-executable program instructions; and
  - a processor to execute the processor-executable program instructions in order to cause the computing device to:
- determine historical resource load information associated with the enterprise computing system based on the captured load information;
- determine future resource needs of the enterprise computing system associated with a future time based on the historical resource load information; and
- at the future time, automatically allocate resources to the enterprise computing system based on the determined resource needs.

14. The system according to claim 13, wherein the automatically allocation of resources to the enterprise computing system at the future time comprises:
- determination of a difference between current resources of the enterprise computing system and the determined resource needs; and
- automatic allocation of the resources to the enterprise computing system based on the difference.

15. The system according to claim 14, wherein the determination of the future resource needs includes:
- determination of second resource needs of the enterprise computing system associated with a second future time based on the historical resource load information; and
- at the second future time, automatically allocate second resources to the enterprise computing system based on the determined second resource needs.

16. The system according to claim 13, wherein the determination of the future resource needs includes:
- determination of second resource needs of the enterprise computing system associated with a second future time based on the historical resource load information; and
- at the second future time, automatically allocate second resources to the enterprise computing system based on the determined second resource needs.

17. The system according to claim 13, wherein the allocated resources comprise one or more of a process, a virtual machine, a processor core, and random access memory.

18. The system according to claim 13, wherein determination of the historical resource load information comprises periodic reception of resource load information from a monitoring component of the enterprise computing system.

* * * * *